United States Patent
Demetriades et al.

(10) Patent No.: US 7,774,720 B1
(45) Date of Patent: Aug. 10, 2010

(54) CONNECTIVITY MAP EDITOR

(75) Inventors: Alexander Demetriades, Pasadena, CA (US); Jerry A. Waldorf, Woodland Hills, CA (US); Tientien Li, Arcadia, CA (US)

(73) Assignee: Oracle America, Inc., Redwood City, CA (US)

( * ) Notice: Subject to any disclaimer, the term of this patent is extended or adjusted under 35 U.S.C. 154(b) by 466 days.

(21) Appl. No.: 11/251,651

(22) Filed: Oct. 14, 2005

Related U.S. Application Data

(60) Provisional application No. 60/619,147, filed on Oct. 15, 2004.

(51) Int. Cl.
*G06F 3/00* (2006.01)
(52) U.S. Cl. .................. 715/853; 715/734; 715/735
(58) Field of Classification Search .......... 715/853, 715/734, 735, 964, 969
See application file for complete search history.

(56) References Cited

U.S. PATENT DOCUMENTS

| | | | |
|---|---|---|---|
| 6,268,853 B1 * | 7/2001 | Hoskins et al. ............. 700/83 |
| 6,542,912 B2 * | 4/2003 | Meltzer et al. ............. 705/39 |
| 7,296,238 B1 * | 11/2007 | Zurawski ................. 715/763 |
| 2003/0007000 A1 * | 1/2003 | Carlson et al. ........... 345/713 |
| 2004/0128120 A1 * | 7/2004 | Coburn et al. ............ 703/26 |
| 2004/0225995 A1 * | 11/2004 | Marvin et al. ............. 717/100 |
| 2005/0038764 A1 * | 2/2005 | Minsky et al. ............. 706/47 |

\* cited by examiner

*Primary Examiner*—Dennis Bonshock
(74) *Attorney, Agent, or Firm*—Osha • Liang LLP

(57) ABSTRACT

Systems and methods relating to enterprise systems are provided. In one implementation, a computer-implemented method for defining components and connections in an integration project is provided. The method includes selecting a project for integrating a plurality of components of an enterprise, adding a first component, the first component representing a first physical resource associated with the project, and positioning the first component on a connectivity map. The method also includes adding a second component, the second component representing a second physical resource associated with the project, positioning the second component on the connectivity map, and defining a connection between the first component and the second component.

18 Claims, 11 Drawing Sheets

| Icon | Component |
|---|---|
| 510 | Service |
| 515 | Queue |
| 520 | Topic |
| 525 | Web Services Application |
| 530 | External Applications |
| 535 | Scheduler |

US 7,774,720 B1

CONNECTIVITY MAP EDITOR

CROSS-REFERENCE TO RELATED APPLICATIONS

This application claims priority to U.S. Provisional Application Ser. No. 60/619,147, filed on Oct. 15, 2004, which is hereby incorporated by reference in its entirety.

BACKGROUND

The present invention relates to enterprise systems.

Conventional enterprises can include a number of different systems for operating different aspects of the enterprise. Typically, the different systems need to be able to communicate and share data. However, some of the enterprise systems may be unable to communicate without extensive human interaction. For example, each system can use a unique platform or operating system as well as a unique method of storing data. Additionally, when an enterprise implements new software or upgrades software to one or more systems, the enterprise can determine that the enterprise systems are incompatible. Conventional integration systems can be used to provide automated communication and data transfer capabilities between the disparate systems within the enterprise.

SUMMARY

Systems and methods relating to enterprise systems are provided. In general, in one aspect, a computer-implemented method for defining components and connections in an integration project is provided. The method includes selecting a project for integrating a plurality of components of an enterprise, adding a first component, the first component representing a first physical resource associated with the project, and positioning the first component on a connectivity map. The method also includes adding a second component, the second component representing a second physical resource associated with the project, positioning the second component on the connectivity map, and defining a connection between the first component and the second component.

Implementations of the method can include one or more of the following features. The components can include services, message destinations, web services applications, external applications, and schedulers. The service component can include data for executing a set of business rules. The message destinations can include topics and queues. The external applications can represent an application located external to an integration suite. The schedulers can define one or more intervals for performing a service. Positioning a component can include dragging the component from an editor toolbar to a position on the connectivity map and defining a connection can include establishing a java message system client between components in the connectivity map.

In general, in another aspect, a method for defining components and connections in an integration project is provided. The method includes selecting a project for integrating components of an enterprise, opening a connectivity map including a plurality of components representing physical resources associated with the project, the connectivity map including logic and routing information about for data in the project, and providing input editing one or more of the components on the connectivity map.

Implementations of the method can include one or more of the following features. The method can further include adding one or more components to the connectivity map and providing input editing one or more connections between the components. The plurality of components can include services, message destinations, web services applications, external applications, and schedulers. The services can include data for executing a set of business rules. The message destinations can include topics and queues. The external applications can represent an application located external to an integration suite. The schedulers can define one or more intervals for performing a service. Editing components can include deleting one or more components, or modifying one or more properties of one or more components. Editing a connection can include establishing a java message system client between components in the connectivity map.

In general, in one aspect, a computer program product for defining components and connections in an integration project is provided. The computer program product includes instructions operable to select a project for integrating a plurality of components of an enterprise, add a first component, the first component representing a first physical resource associated with the project, and position the first component on a connectivity map. The computer program product also includes instructions to add a second component, the second component representing a second physical resource associated with the project, position the second component on the connectivity map, and define a connection between the first component and the second component.

In general, in another aspect, a computer program product is provided for defining components and connections in an integration project. The computer program product includes instructions operable to select a project for integrating components of an enterprise, open a connectivity map including a plurality of components representing physical resources associated with the project, the connectivity map including logic and routing information about for data in the project, and provide input editing one or more of the components on the connectivity map.

The invention can be implemented to realize one or more of the following advantages. A connectivity map editor can be provided as a graphical user interface that allows a user to join different components, for example, within a business process or integration project. The connectivity map can bind the different components together. The actual component can then be invoked according to the binding within the connectivity map. Binding components through the connectivity map can provide flexibility in allowing different components to be joined together without modifying the actual underlying components.

DETAILED DESCRIPTION

The ICAN Suite

Figure 1A:
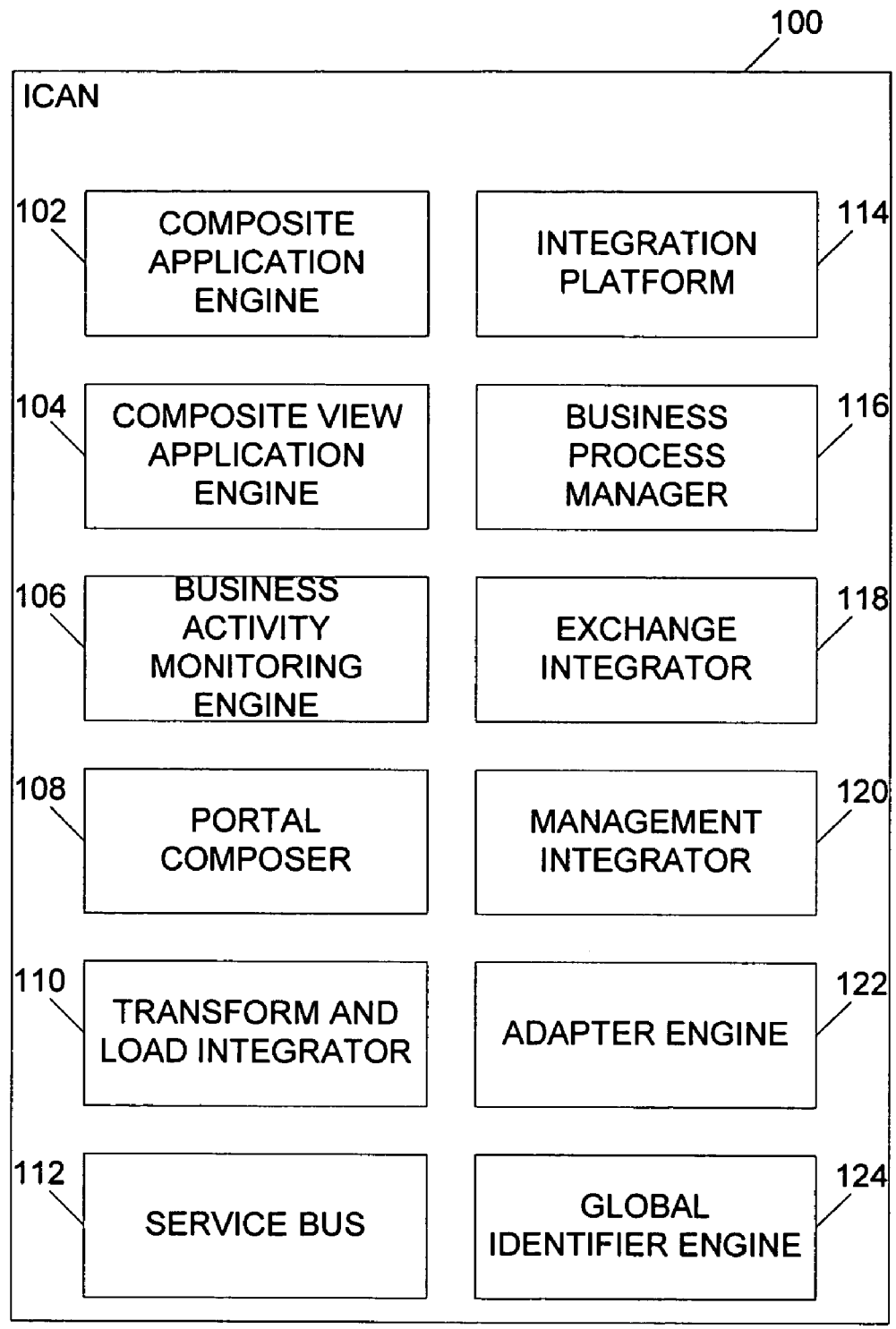
FIG. 1A shows an implementation of an Integrated Composite Application Network ("ICAN") Suite

In FIG. 1A, an Integrated Composite Application Network ("ICAN") Suite 100 is provided to allow an enterprise to provide configurable and automated business process flows. The ICAN Suite 100 can assemble the functionality of existing applications and systems within an enterprise. The ICAN Suite 100 can also deliver a fully distributed, centrally managed solution for the assembly, deployment, and management of enterprise-scale, end-user applications. In one implementation, the ICAN Suite 100 provides an open, standards-based, service-oriented architecture. In one implementation the ICAN Suite 100 includes a Java 2 Platform, enterprise edition ("J2EE") certified, portable, and integrated composite application network. The ICAN Suite 100 can enable the creation of composite applications including enterprise-scale, interactive, end-user applications that span multiple, cross-organizational business processes to connect people, systems, and devices as required. In another implementation, the ICAN Suite 100 allows business users, as well as developers, to easily create interactive applications that call on available business processes and web services, packaging pages together as a coordinated composite application. One example of ICAN suite 100 is available from SeeBeyond, Inc.

In one implementation, the ICAN Suite 100 includes twelve core engines including a composite application engine 102, a composite view application engine 104, a business activity monitoring engine 106, a portal composer 108, a transform and load integrator 110, a service bus 112, an integration platform 114, a business process manager 116, an exchange integrator 118, a management integrator 120, an adapter engine 122, and global identifier engine 124.

The composite application engine (referred to as eVision Studio) 102 can enable the design and generation of interactive web and wireless composite applications and, in one implementation, without any programming. The composite application engine 102 can create end-user business interfaces that overlay composite applications and workflow management.

The composite view application engine (referred to as eView Studio) 104 can enable the design and generation of "single-view" composite applications for cleansing, matching, and indexing user-defined business objects. For example, the user-defined business objects can include customers, businesses, or products that are not uniquely identified across all enterprise systems.

The business activity monitoring ("BAM") engine (referred to as eBAM Studio) 106 is a tool for rapidly designing and generating BAM composite applications without any programming. The BAM composite applications can include real-time alerts, graphical dashboards and reports, and a display of key performance indicators ("KPI") as defined by one or more business users.

The portal composer (referred to as ePortal Composer) 108 is a full-featured portal generation tool that can provide aggregation of one or more web-based channels with content personalization and administration services.

The transform and load integrator (referred to as the eTL Integrator) 110 can provide Extract, Transform, and Load ("ETL") functionality optimized for very large record set and bulk data transformation and movement scenarios.

The service bus (referred to as the eInsight Enterprise Service Bus) 112 can provide coordination for enterprise web services.

The integration platform (referred to as eGate Integrator) 114 can provide a web services and J2EE-based integration platform.

The business process manager (referred to as eInsight Business Process Manager ("BPM")) 116 can provide an open and web services-based business process management solution.

The exchange integrator (referred to as eXchange Integrator) 118 can provide a solution for defining trading partner profiles and protocol management for business-to-business interoperability.

The management integrator (referred to as eXpressway Integrator) 120 can provide management capabilities for streamlined distribution, configuration, and management of the various engines and services within the ICAN Suite 100.

The adapter engine 122 can provide a line of pre-built adapters (referred to as eWay Intelligent Adaptors) for common applications and data stores. In one implementation the adapter engine 122 can support Java Cryptography Architecture ("JCA") as well as expose applications as web services. In one implementation, the adapter engine 122 can include more than 80 pre-built adapters.

The global identifier engine (referred to as eIndex Global Identifier) 124 can provide an indexing solution for web-based access and user configuration of matching criteria.

The eGate Integrator 114

Disparate applications, databases, and other enterprise components can be linked together using an integration platform such as the eGate Integrator 114. In one implementation, the eGate Integrator 114 is a J2EE certified and web services-based, integration platform. The eGate Integrator 114 can provide a core integration platform, comprehensive systems connectivity, guaranteed messaging, and robust transformation capabilities. The eGate Integrator 114 can further provide a unified, single sign-on environment for integration development, deployment, monitoring, and management. In one implementation, the eGate Integrator 114 can support portability of integrations across common J2EE application servers through an open, J2EE-certified, and web services-based architecture.

The eGate Integrator 114 can include an integrated Universal Description, Discovery and Integration ("UDDI") compliant server for providing publication and discovery of web services. In one implementation, the run-time environment employs J2EE-compliant integration servers as operational engines and Java Message Service ("JMS") compliant message servers for the propagation of messages. The eGate Integrator 114 can be deployed in a run-time environment or to third-party application servers, across a distributed network of hardware platforms. Additionally, the eGate Integrator 114 can communicate with and link multiple applications and databases across a variety of different operating systems. The eGate Integrator 114 can interact with a wide variety of hardware, message standards, operating systems, databases, and communication protocols in both real-time and batch (e.g., scheduled) integration modes.

Integration Architecture

Figure 1B:
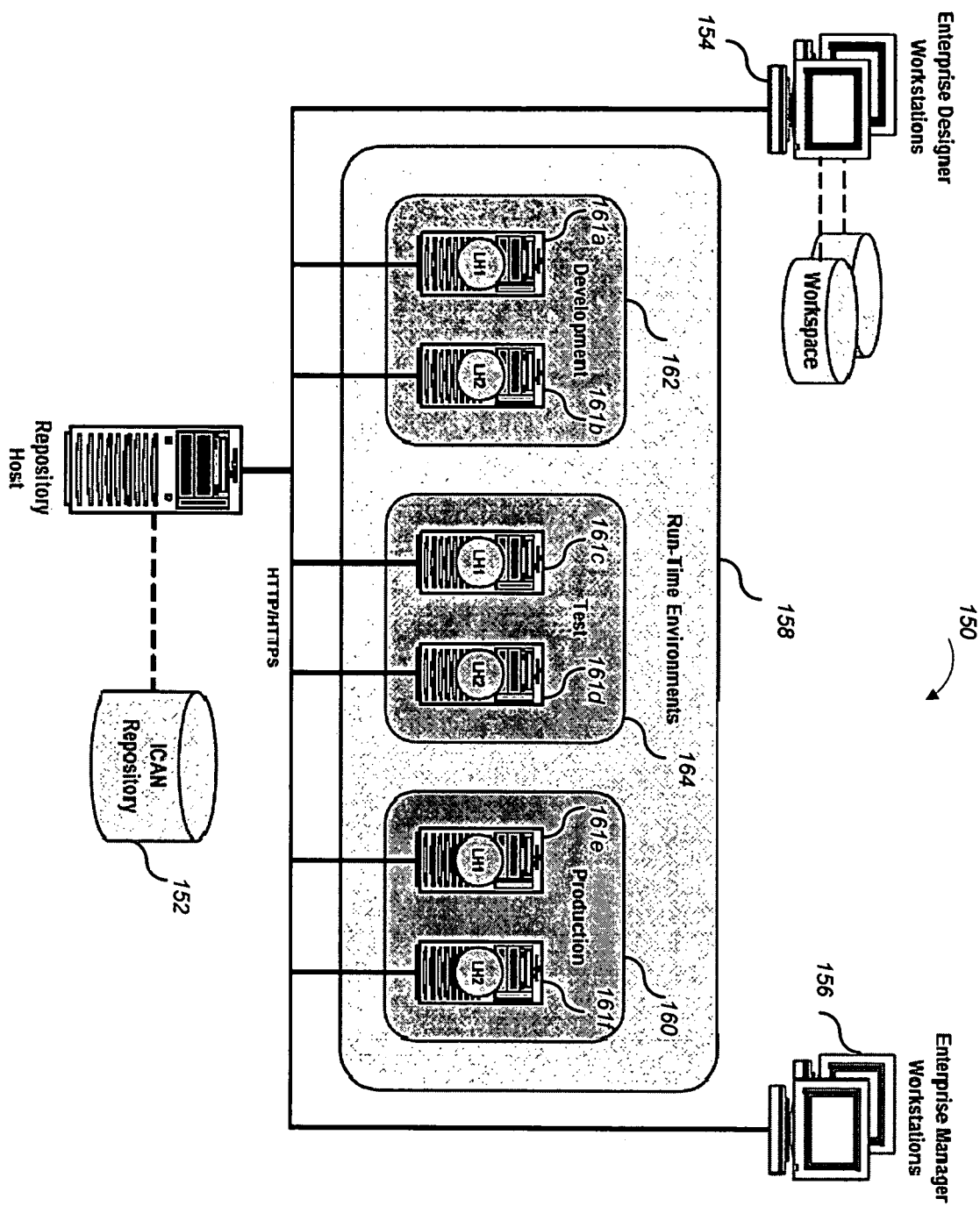
FIG. 1B shows an integration system.

The eGate Integrator 114 can be implemented in a single or distributed computing environment. As a result, the various components of an eGate Integrator system can reside on a single hardware platform, or be distributed across several different hardware platforms in an enterprise network. FIG. 1B shows an example of an eGate Integrator 150 implemented as a distributed system. The eGate Integrator 150 includes an enterprise manager 156, an enterprise designer 154, a repository 152, and environments 158. The enterprise manager 156 and enterprise designer 154 can provide user interfaces for interacting with the eGate Integrator 114. The environments 158 include a production environment 160, a development environment 162, and a testing environment 164. In one implementation, each environment 158 includes one or more logical hosts 161*a*-161*f*.

User Interface

In one implementation, the eGate Integrator 150 provides graphical user interfaces ("GUIs"). Each respective user interface can be directed to a different set of users. The enterprise manager 156 includes a GUI that can be used by an entire ICAN Suite (e.g., ICAN Suite 100). In one implementation, the primary users of the enterprise manager 156 are system administrators. The enterprise manager 156 can provide a web-based interface for installing and updating the eGate Integrator 114 as well as allowing the user to monitor and manage components of the eGate Integrator 114. The enterprise manager 156 can also be used to load components to the repository 152. In one implementation, the enterprise manager 156 includes a web-based application operable using a browser of a computing system.

The enterprise designer 154 can be used, for example, by users who are involved in defining software systems for integrating various enterprise applications using the eGate Integrator 150 and other ICAN Suite products. The enterprise designer 154 can provide a unified, graphical development environment for integrating systems and developing composite applications.

In one implementation, the enterprise designer 154 can be used to create and configure logical components and physical resources of a project for integrating applications or other enterprise components. A project includes logical components and other supporting information for performing routing, processing, and caching of messages from one application to another. Projects are discussed in further detail below. The user can develop projects to process and route data through the eGate Integrator 150 using the GUI of the enterprise designer 154. The enterprise designer 154 can also be used by other components of the ICAN Suite 100, for example, the eInsight Business Process Manager 116 or eXchange components.

In one implementation, the GUI of the enterprise designer 154 includes an enterprise explorer and an editor panel. The enterprise explorer can provide a data structure for displaying and interacting with components of the eGate Integrator 150 including applications, editors, and other components. In one implementation, the enterprise explorer provides a tree structure. The editor panel can display a variety of editors, depending upon which component of the eGate Integrator 150 is opened in the enterprise explorer. The editors include, for example: a connectivity map editor, an object type definition ("OTD") editor, a Java collaboration editor, an extensible stylesheet language transformation ("XSLT") collaboration editor, an environment editor, and a deployment profile editor.

Repository

Setup, components, and configuration information for elements of each project performed by the eGate Integrator 114 are stored in the repository 152. The repository 152 can also store product binary files used at run time by one or more logical hosts 161. In one implementation, the components and configurations for a project can be downloaded to one or more logical hosts 161 during an initial bootstrap process and as needed after design-time configuration changes are made.

As shown in FIG. 1B, a single repository 152 can serve an entire enterprise. In an alternative implementation, several repositories can be used. The repository 152 can store information for development, testing, and production of integration projects.

The enterprise designer 154 and enterprise manager 156 clients can communicate with the repository 152. In one implementation, communication between the repository 152 and other ICAN components can be provided using different protocols including HTTP and HTTPS. In another implementation, the enterprise designer 154 and the enterprise manager 156 communicate with the repository 152 through a firewall providing security to the repository 152. Additionally, the repository 152 can make web services available through a UDDI registry.

Run-Time Environments

The environments 158 represent the physical applications, databases, components, and other resources used to implement a project. The environments 158 also include information about one or more external systems with which a project can interact. In one implementation, each environment 158 includes of a collection of logical hosts 161, capable of hosting components of the ICAN Suite 100, along with information about external systems required to implement a particular project. The eGate Integrator 150, shown in FIG. 1B includes three separate environments 160, 162, and 164.

Logical Hosts

Each environment 158 includes one or more logical hosts 161. The logical hosts 161 contain run-time components that are installed on a host hardware platform. In one implementation, each logical host 161 can be a member of only one environment, but each environment can include multiple logical hosts 161.

In one implementation, each logical host includes one or more integration servers and message servers. The integration servers are engines that run collaborations and eWays. A collaboration is a logical operation performed between a combination of message destinations and external applications. An eWay is a link between a collaboration and an external connection including the message server connection (e.g., a topic or queue) or external application. Collaborations and eWays are discussed in further detail below. The message servers include message servers such as a JMS IQ Manager, which manage JMS topics (publish-and-subscribe messaging) and queues (point-to-point messaging).

External Systems

An external system is a representation within the environment 158 of a real, physical system. The external system includes configuration properties for locating and accessing the corresponding physical system. In the example system shown in FIG. 1B, the production environment 160 is split across two hardware platforms, each supporting a single logical host 161. In one implementation, separate environments 158 for development 162 and testing 164 can duplicate the structure of the production environment 160. The test environment 164 can be supported by hardware similar to that supporting the production environment 160 to allow performance and load testing to give representative throughput results. In one implementation the hardware supporting the development environment 162 does not have the same performance requirements as that supporting the test and production environments 164 and 160.

In one implementation, a particular project can be created within the development environment 162. After project creation, the project can be transferred to the test environment 164 for performing test operations on the project, and finally to the production environment 160, where the project can be implemented. In an alternative implementation, a distributed system is not used and the components shown in FIG. 1B can run on a single system.

Integration Projects

Integration of enterprise applications is facilitated using a project. Each project contains business logic required to solve a specific problem and defines a business process. The project includes the logical components and supporting information for performing the routing, processing, and caching of messages containing the relevant data from one application to another. Thus, a project can provide for the integration of particular application or other components across the enterprise. In one implementation, project information can be stored in the repository 152. The projects can be created using tools contained within the enterprise designer 154 and, once deployed (e.g., in production environment 160), can be run and monitored using the enterprise manager 156. The projects can also be configured to run from a business process level using, for example, the business process manager 116.

Each project can be run within one or more logical hosts 161 of an environment 158. In one implementation, the projects are mapped to individual environments 158 using deployment profiles. The deployment profiles can map a business process to the particular environment where the process will be running. In one implementation, the deployment profiles are defined within the enterprise designer 154 and become part of the project. Activating a particular deployment profile (e.g., according to user input) deploys a particular project to an associated environment.

In one implementation, once the user builds projects and environments, the user can change each individual component of the project without having to make changes to the other components. In one implementation, the finished project can be run within the production environment 160. Separate environments 158, having a similar structure as the production environment 160, can be created (e.g., development environment 162 and testing environment 164). The user can also define additional environments, such as a staging environment.

Each project can be deployed to any of the environments 158 using a mapping defined in the deployment profiles. Implementing an integration project using the eGate Integrator 150 includes the steps of designing a project, defining one or more environments, creating deployment profiles, and deploying the project. In one implementation each of the implementation steps can be performed using the enterprise designer 154. The enterprise designer 154 can also be used to create and configure the logical components and physical resources of a project.

In one implementation, projects can include several different components including services, external applications, component connections, and message destinations. The services provide a framework for a process or a collaboration that includes information required to execute a set of business rules.

The external applications are a logical representation of external software applications that are being integrated by the eGate integrator 150. An external application can be linked to a service, for example, using an eWay. Component connections are links between components of a project and include eWays. Component connections can be performed though the connectivity map editor discussed below.

Message destinations are containers for stored data. In one implementation, the message destinations can follow a topic or queue JMS model. A topic is a message destination that conforms to a publish-and-subscribe messaging paradigm while a queue is a message destination that conforms to a point-to-point messaging paradigm.

Connectivity Map Editor

The components of a particular project can be defined and connected using the connectivity map editor. The eGate Integrator 150 can use connectivity maps to intuitively configure the end-to-end flow of messages within an integration project. A connectivity map provides a graphical representation of a project that includes various logical components that make up the project and the links between the components. The connectivity map editor allows a user to specify the connections between multiple applications and databases across different operating systems as well as one or more collaborations that integrate the applications and databases. The user can drag and drop the various collaborations, intelligent queues, and external-system eWay adapters onto a connectivity map canvas and link them together to specify message flow. The connectivity map generated in the connectivity map editor can provide for the identification of the services to be used for a particular project. The connectivity map can be used to bind different components of a project together (e.g., bind services) without modifying or impacting the underlying physical components. The connectivity map editor can be used to create, configure, and maintain the component connections.

Figure 2:
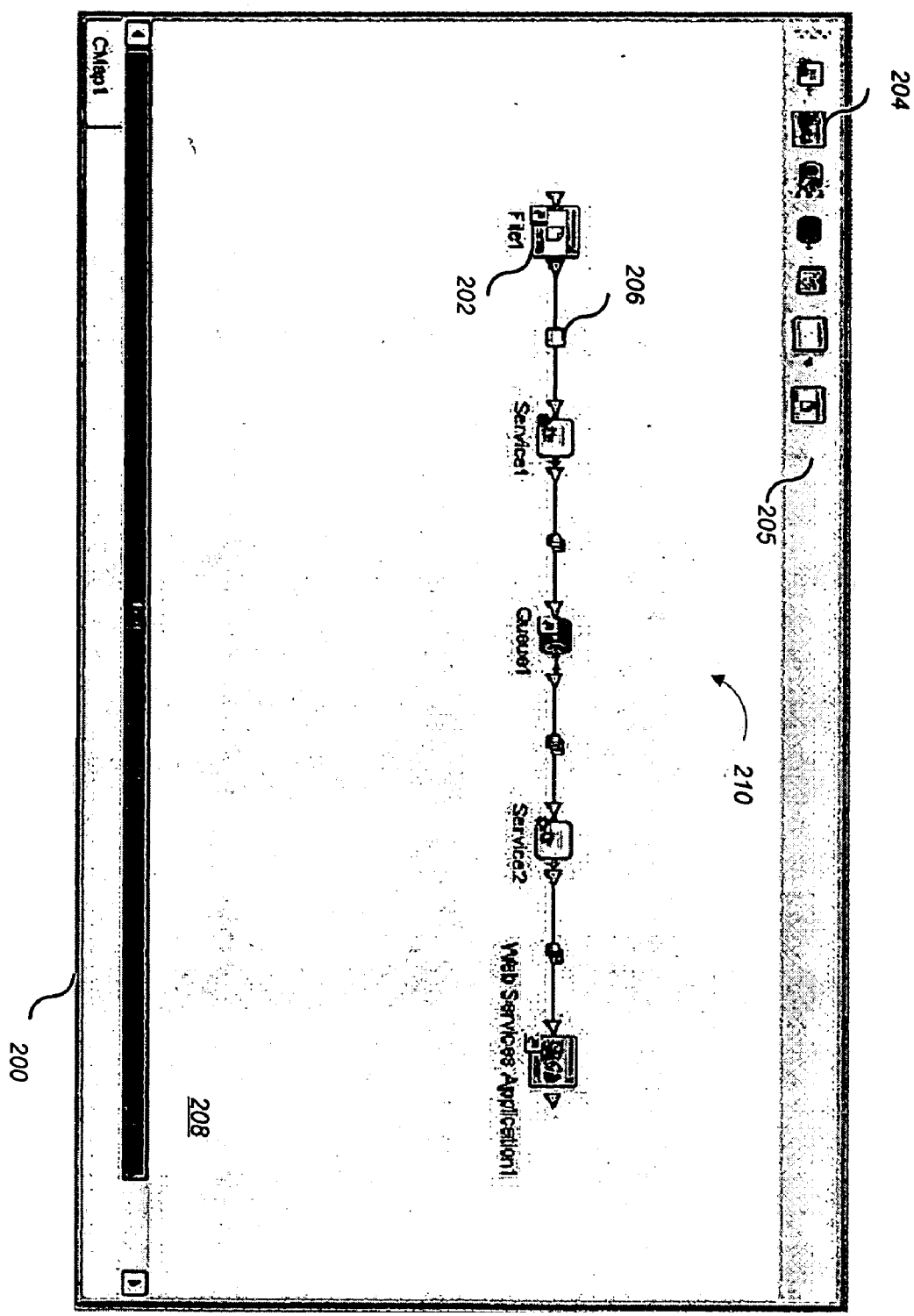
FIG. 2 illustrates a process for connecting components of a project.

An example of a connectivity map editor 200 for connecting components of a project is illustrated in FIG. 2. A user can create a new, or selects an existing, connectivity map 210 in the enterprise explorer (e.g., the enterprise explorer of enterprise designer 154). The connectivity map 210 is displayed within an editor panel of the connectivity map editor 200. The connectivity map editor 200 includes components 204 represented by various icons in a toolbar 205 and a canvas 208 for positioning and editing the various components 204 of the project and the connections 206 between the components 204 forming the connectivity map 210. The different components are described in greater detail below.

Figure 10:
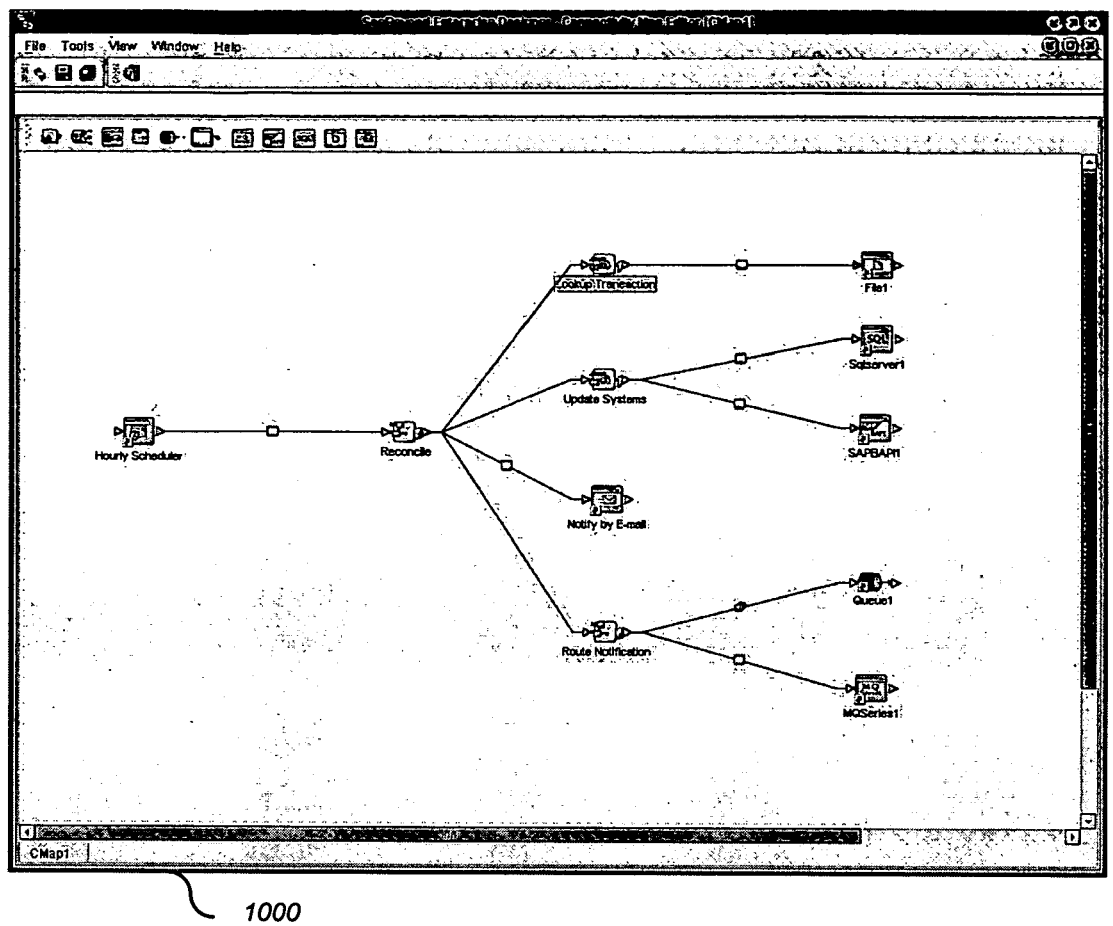
FIG. 10 shows an example of a connectivity map.
Figure 11:
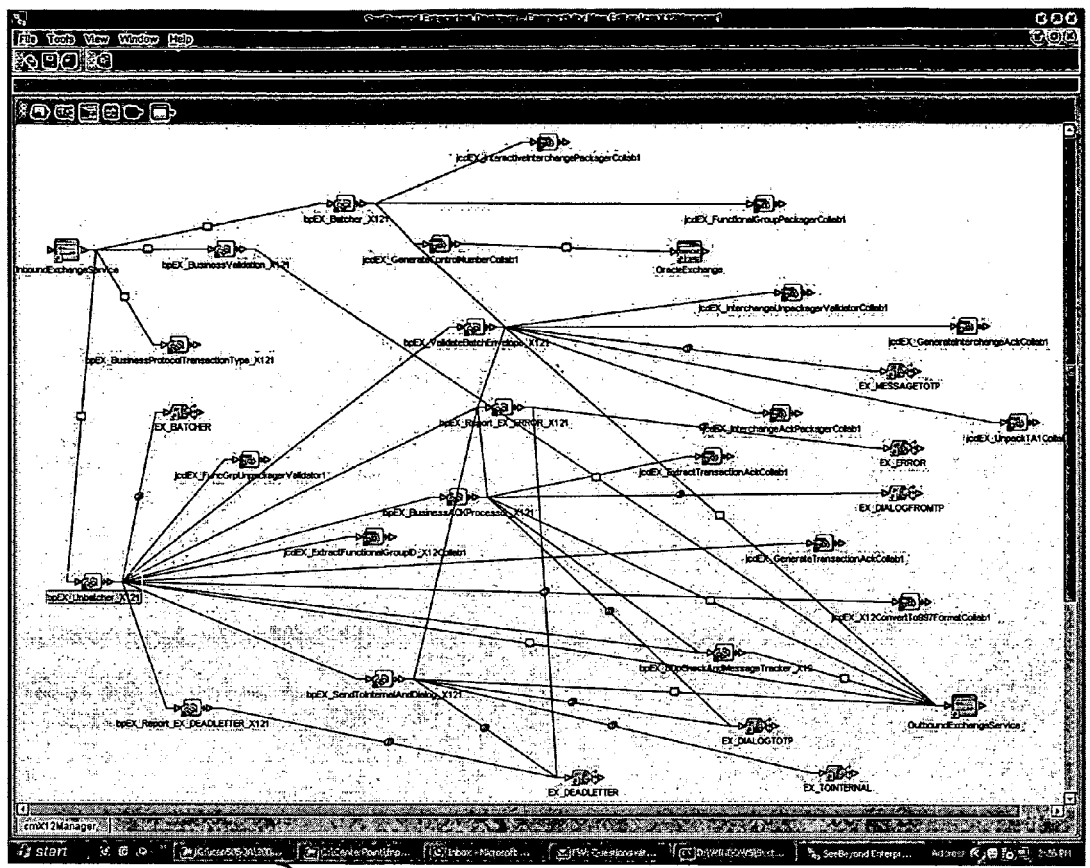
FIG. 11 shows an example of a connectivity map.

To create the connectivity map 210, the user can drag components 204, for example using a cursor, (e.g., icon 202) from a toolbar 205 to the canvas 208 to populate the connectivity map 210 with the necessary components 204 for the project. Components within the connectivity map 210 can be connected using one or more links (e.g., connection 206). In one implementation, the user can create a link between a pair of components 204, for example, by dragging the cursor from one to the other. FIGS. 10 and 11 show examples of connectivity maps 1000 and 1100 that illustrate different examples of connectivity maps for different projects.

Figure 3:
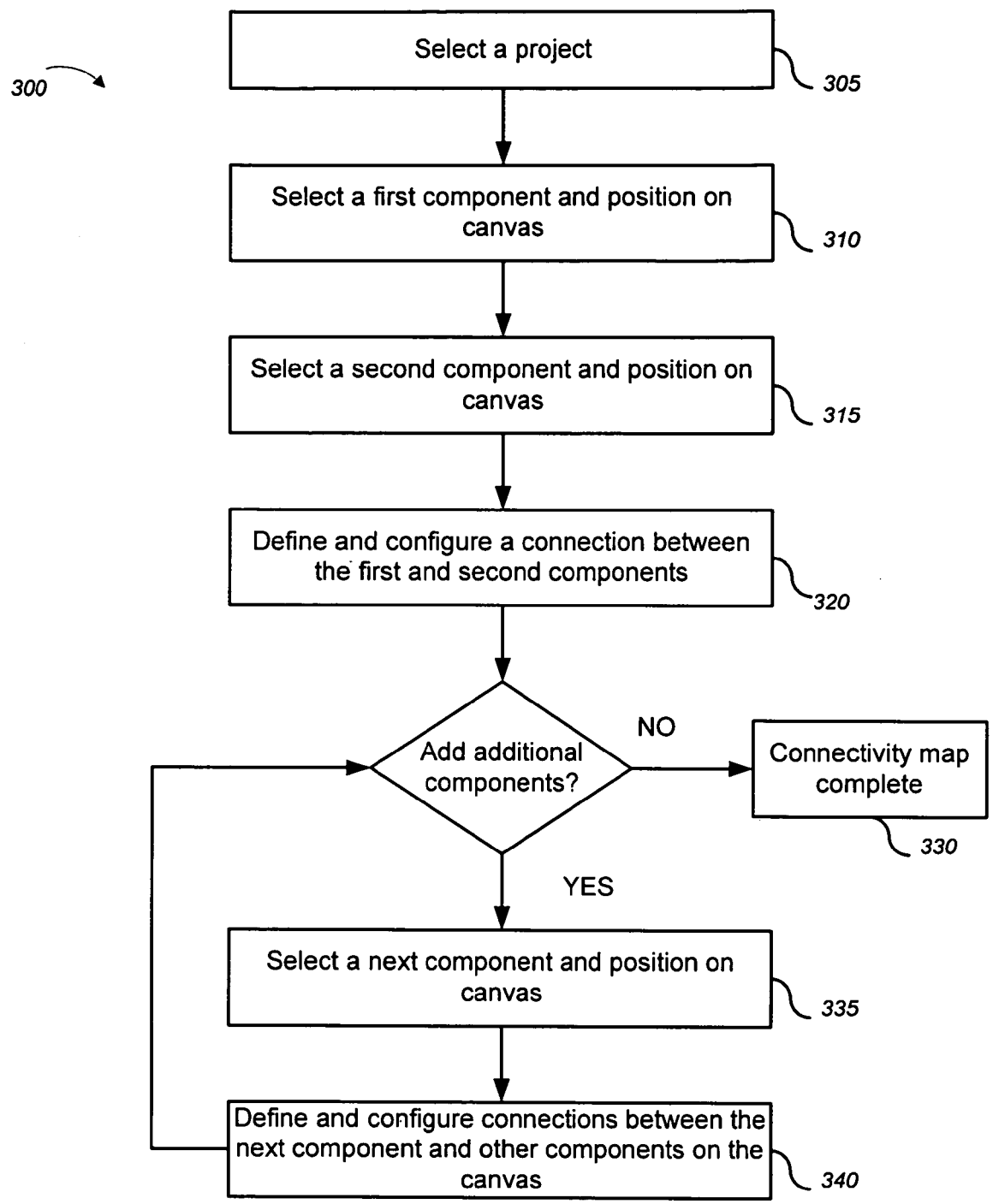
FIG. 3 shows a connectivity map editor.

FIG. 3 illustrates a process 300 for connecting components of a project. A user first selects a project, for example from the enterprise explorer (step 305). For the selected project, the user can create a connectivity map in the connectivity map editor (e.g., connectivity map editor 200) for manipulating components of the project. The connectivity map editor provides representations of components and facilitates connections between the components for implementing the selected project. The user can select a first component (e.g., component 204) from a plurality of different components and position (e.g., by dragging and dropping) the first component to a workspace (e.g., canvas 208) in the connectivity map editor (step 310). The user can select a next component from the plurality of components and position (e.g., by dragging and dropping) the next component to a desired position on the canvas (step 315). The user can then define and configure a connection (e.g., connection 206) between the first component and the next component (step 320) (e.g., by drawing a path between two components).

The user can then determine if additional components are to be added for the particular project (step 325). If no additional components to be added, the connectivity map is complete (step 330). If additional components are to be added, a next component is selected and positioned on the canvas (step 335). The user then defines a connection between the next component and one or more other components (step 340). Additional components are added and connections made until the components for the project have been positioned on the connectivity map. In an alternative implementation, after selecting a project the user can open an existing connectivity map in the connectivity map editor. The user can then edit components and/or connections within the connectivity map. For example, the user can add new components to the connectivity map, edit properties of existing components, and delete unnecessary components as well as creating new, or modifying existing, connections between components.

Figures 4, 5:
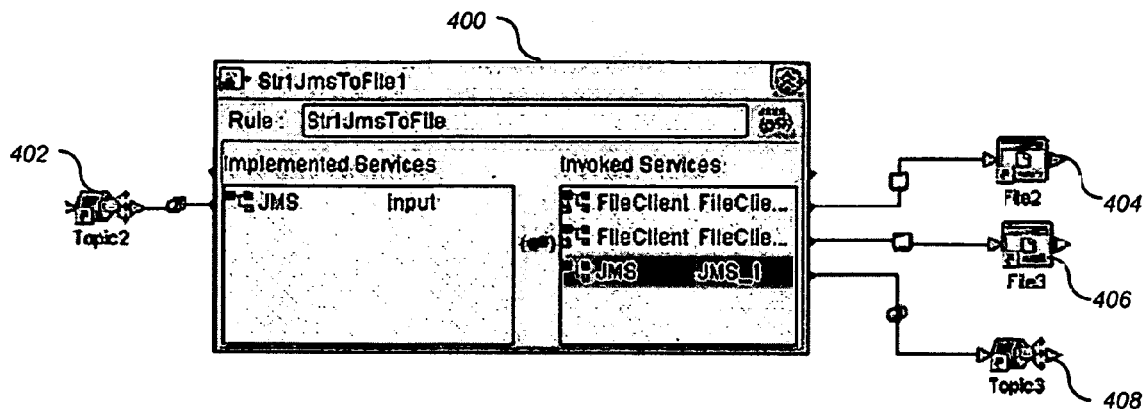
FIG. 4 shows a collaboration binding box.
FIG. 5 shows a plurality of components for use in the connectivity map editor.

In one implementation, the components 204 can include components representing services, queues, topics, schedulers, and external applications. Additional components, such as eWays and JMS clients, which can define connections between components, can be added automatically or manually when the user connects the components 204 positioned on the canvas 208. In one implementation, a particular component can have multiple output destinations, for example a JMS topic, which in one implementation can have three output destinations from a single input. When a component has multiple outputs, the connectivity map editor 200 cannot automatically determine which output port connects to which destination component. In one implementation, the connectivity map editor provides a dialog box for the user to identify or designate destination components for the multi-output component. FIG. 4 illustrates a collaboration binding box 400 for specifying output destinations for an input component 402 having multiple destinations. The collaboration binding box 400 allows a user to select different components as the destination from input component 402. FIG. 4 shows three destination components 404, 406, and 408, each of which are connected to input component 402.

Referring back to FIG. 2, the components 204 shown in toolbar 205 include icons representing some of the standard components plus additional icons representing add-on components and other ICAN components and eWays that have been installed on the eGate Integrator 150. FIG. 5 illustrates some of the corresponding components for use in the connectivity map editor 200.

A service component 510 represents logical components that provide a framework for a process or collaboration, which includes information for executing a set of business rules. A queue component 515 represents a message destination that conforms to a point-to-point messaging paradigm, having one sender and one receiver. The topic component 520 represents a message destination that conforms to a publish/subscribe messaging paradigm, having one sender (e.g., a publisher) and multiple receivers (e.g., subscribers). In one implementation, a message destination is a general term for a topic 520 or queue 515. A message destination can be described as a container for stored data, and can follow either a topic or queue JMS model. In one implementation, two or more projects can share a message destination that has a same name and is deployed on a same message server. Additionally, a single project can also have a single message destination referenced in multiple connectivity maps.

The web services application component 525 represents a web services application. A web services application 525 can represent either an external web service that can be invoked by a web client including a business process, or a business process that is exposed as a web service. If the business process is exposed, the exposed web service can be listed in a Universal Description, Discovery and Integration ("UDDI") registry. In one implementation, only one web services application can be used in a single environment. In another implementation, the web services application can include several properties including a hostname, port, and servlet context. The hostname indicates the name of the computer hosting the web services application. The port indicates the port for accessing the web services application, and the servlet context indicates the path and name of the web services application.

The external applications component 530 represents an application external to the eGate Integrator 100 (e.g., external business applications from which the user desires to exchange data). In one implementation, the user can select a menu positioned beside the component (e.g., on the toolbar 205) to view a list of specific applications to which the user can connect. In one implementation, the eGate Integrator 100 can use projects defined by a connectivity map 210 to provide the interchange of data between external business applications. These business applications are collectively referred to as external applications 530, and can be represented in the project by logical proxies for the specific applications involved. In one implementation, the external applications 530 can be identified with an Enterprise Resource Planning ("ERP") application such as those provided by SAP or PeopleSoft, a Database Management System ("DBMS") such as Oracle or SQL, or with a particular communications protocol, such as TCP/IP or HTTPS.

External applications 530 include logical representations of external software applications that are being integrated by the eGate Integrator 100. The external applications 530 can be linked, for example, to a service 510 using a connection 206 such as an eWay. An eWay is a link between a collaboration and an external connection such as a message server connection (e.g., topic 520 or queue 515) or an external application 530. In one implementation, a drop-down menu associated with an external application 530 can be selected to display available external application 530. The external applications 530 can be available, for example, because eWays have been previously established for the external applications 530. In one implementation, the user can select (e.g., using a check box in the menu) an individual external application listed on the menu to add the corresponding external application 530 to the list of components, for example on the toolbar 205. Similarly, the user can deselect an external application 530 (e.g., by clearing the check box) to remove the external application 530 from the toolbar 205. In one implementation, the drop-down menu for the external applications also includes a scheduler component which can be added. In an alternative implementation, the scheduler component can independently be added to the toolbar 205 or otherwise accessible to the user.

The scheduler component 535 allows a service 510 to be performed at a predetermined interval. In one implementation, the interval can be static. In another implementation, the interval can be made dynamic by using a project variable for the interval value. Once the scheduler 535 is connected to the service 510 in the connectivity map 210, the user can select (e.g., by double-clicking) the scheduler 535 to display a properties dialog box for that scheduler 535.

Figure 6:
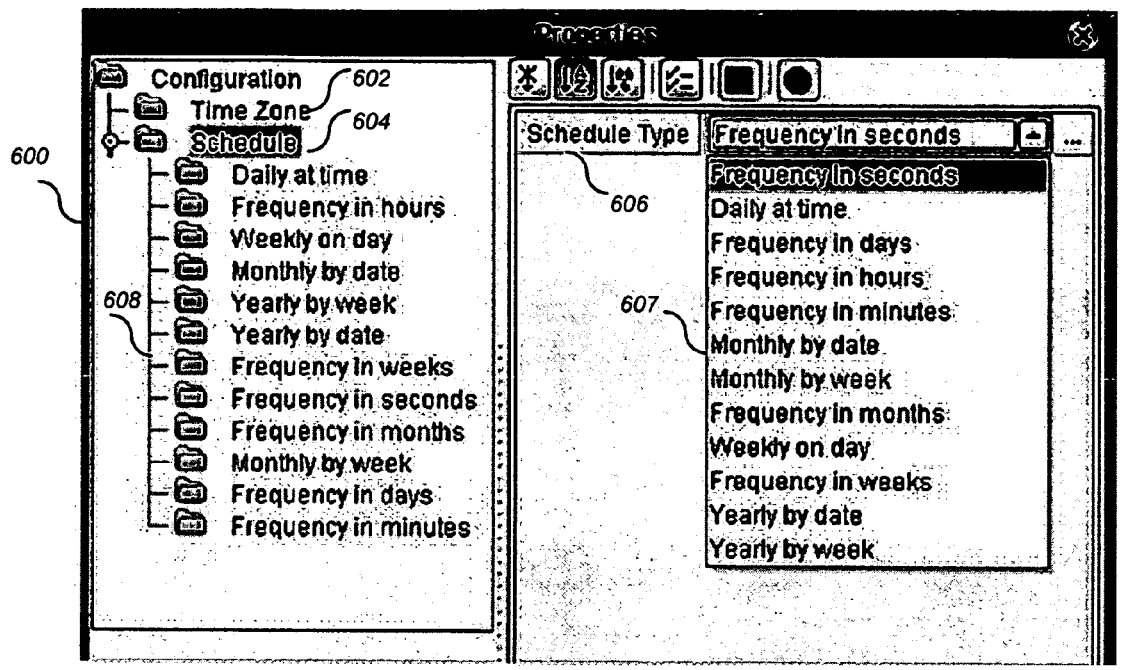
FIG. 6 shows a scheduler.

An example of a properties dialog box 600 for scheduler 535 is shown in FIG. 6. The properties dialog box 600 allows the user to configure the scheduler 535 to define an interval for performing a particular service associated with the project of the connectivity map 210. A user selection of a time zone 602 displays the time zone property field. In one implementation, the user can specify a local time zone using the time zone 602, such that the scheduled service can be synchronized to the local time. The properties dialog box 600 also includes a schedule 604. In one implementation, a user selection of the schedule 604 displays a schedule type property field 606 from which the user can select a scheduled interval or frequency for performing the service. In one implementation, different scheduling intervals can be displayed in a window 607 or as branches 608 beneath the schedule 604. The user can select a particular interval for the service such as a frequency in hours, minutes, days, seconds, or some other time period. Additionally, the user can select a time for the service to occur, for example, at a particular time of day or on a particular day of the week.

In one implementation, the logical components appearing in the connectivity map 220 are only representative placeholders that refer to components 204 existing in the repository 102 and accessible through the project explorer. Consequently, a user can rename or delete a component, such as a queue or topic, in the connectivity map 210 without affecting the underlying component in the repository 102. Thus, modifications can be made to the connectivity map 210 without impacting the underlying components in the repository 102. Also, renaming or deleting a queue or topic component in the repository 102 will not affect the existence or name of the associated placeholder in the connectivity map 210. The user can therefore reassign connectivity map representations of a component deleted in the repository 102 to a replacement component without disrupting the continuity of the connectivity map 210.

Collaborations

A collaboration is a logical operation performed between some combination of message destinations (e.g., queues and topics) and external applications. In one implementation, the operation is defined by a collaboration definition, which can be encoded, for example, in Java or XSLT.

Figure 7:
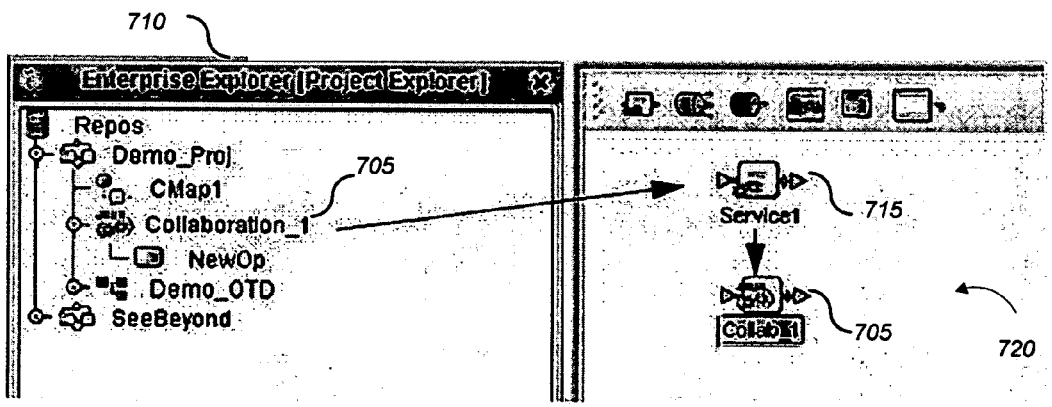
FIG. 7 shows a collaboration.

The collaboration can be implemented as a type of service having a publication or subscription relationship with each connected component. The connection can be provided, for example, by a JMS Client or eWay connection. FIG. 7 illustrates one technique for including collaboration 705 in a connectivity map 720. In one implementation, a user can select the collaboration 705 from a project explorer 710 of the enterprise explorer. After selecting the collaboration 705, the user can drag the collaboration 705 to a particular service 715 on the canvas of the connectivity map 720.

By dragging the collaboration 705 to the service 715, the user defines the service 715 as a collaboration. In one implementation, the user can define the connection properties for the collaboration 705 (or other service) through an adjoining JMS client or eWay (not shown). These connection properties can include concurrent or serial processing, transaction mode, and security for the collaboration 705.

Component Connections

Figure 8:
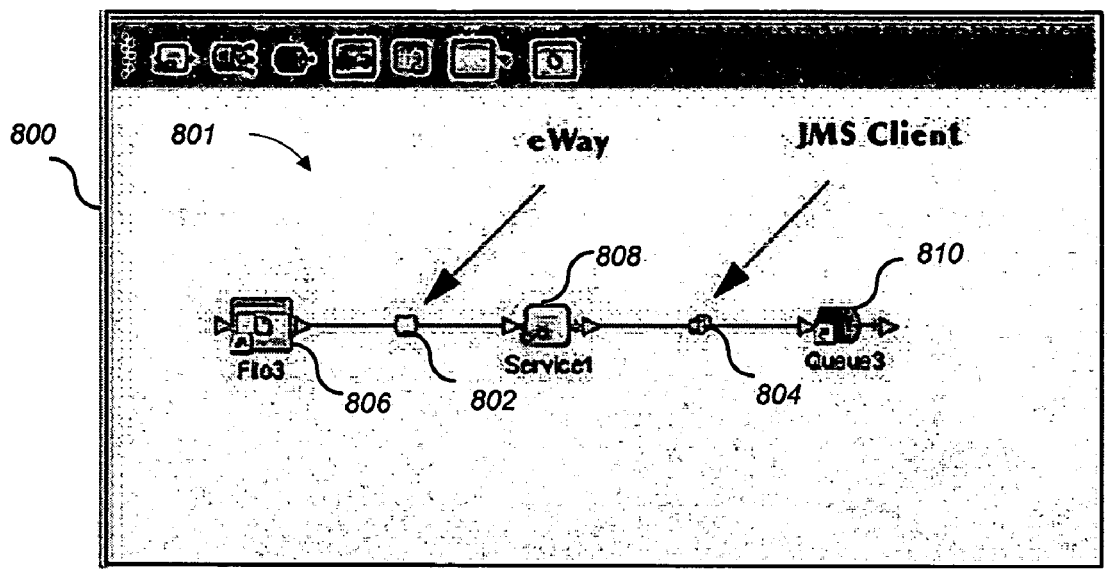
FIG. 8 shows a connectivity map designation of an eWay and a Java Message Service client.

FIG. 8 shows an example of different types of connections placed between components in a connectivity map 801 in a connectivity map editor 800. In one implementation, when the user connects two components on the connectivity map 801, the enterprise designer can place either an eWay 802 or JMS client 804 connection defining the connection, according to the type of components being linked. For example, when the user connects an external application with a collaboration or other service, the enterprise designer can automatically add an eWay connection 802 to the connection. As shown in FIG. 8, an eWay connection 802 is shown between an external application 806 (in this example, an external file) and a service 808. The eWay 802 can provide communication and movement of data between the external application 806 and the eGate Integrator 100. A configuration can be associated with the eWay for specifying the logical properties for the connection.

In another implementation, when the user connects internal components, such as the service 808 with a message destination 810 (e.g., queue or topic), the enterprise designer can instead add a JMS client connection 804. As shown in FIG. 8, the JMS client connection 804 connects the service 808 and message destination 810, specifically a queue. The JMS client configuration can specify the logical properties for the connection.

Configuring a Connection

Figure 9:
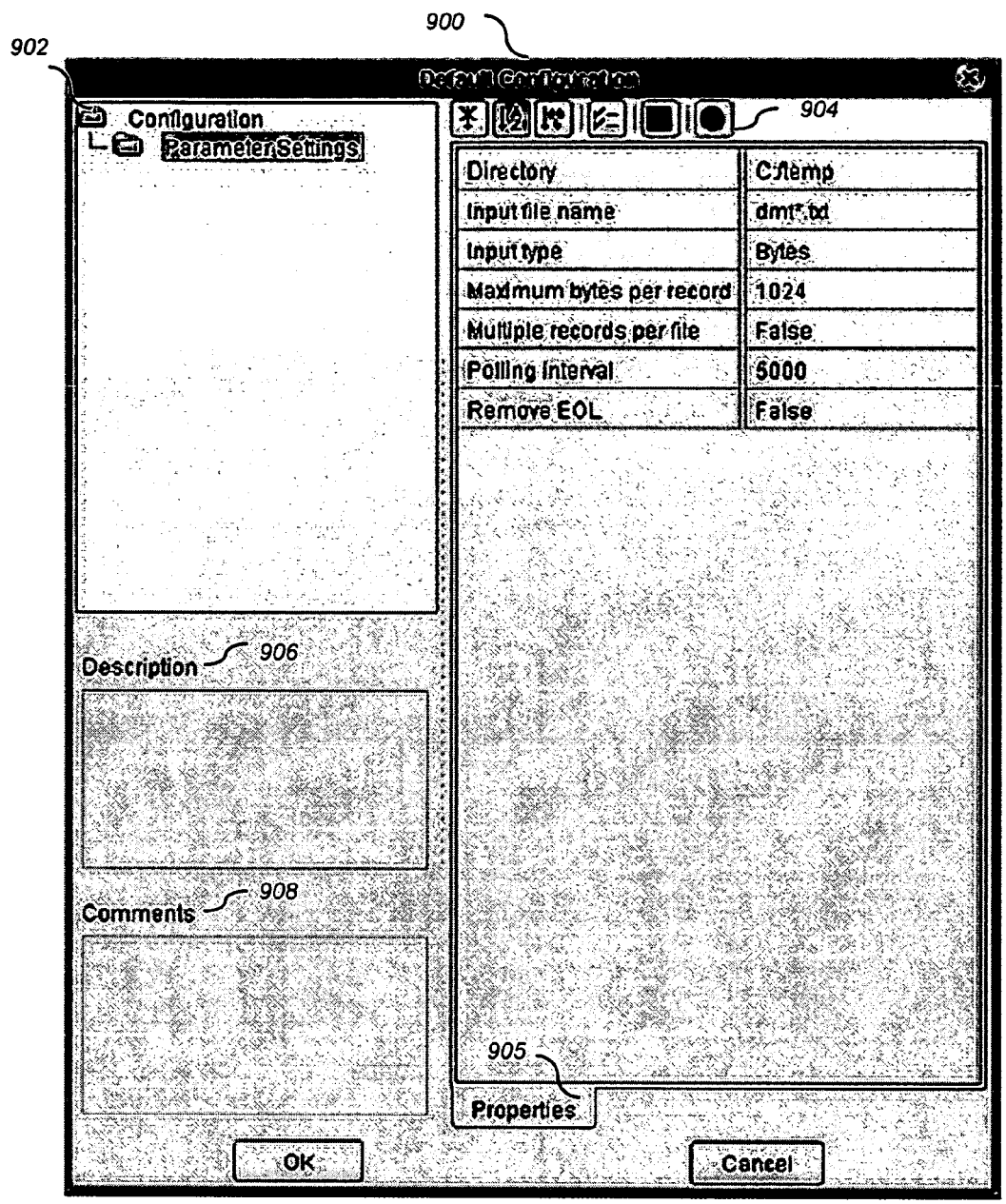
FIG. 9 shows a configuration dialog box.

In one implementation, selecting (e.g., by double clicking) an eWay or JMS client connection in the connectivity map (e.g., eWay 802 or JMS client 804 in connectivity map 800) displays a configuration dialog box. An example configuration dialog box 900 for a file eWay (e.g., eWay 802) is shown in FIG. 9. In one implementation, when the user initially selects a particular eWay or JMS client, a templates dialog box can be displayed (not shown). In the templates dialog box, the user can designate an eWay as inbound or outbound from a particular component (e.g., an eWay 802 outbound from external application 806). Following the user designation, the connectivity map editor displays the configuration dialog box 900 associated with the selected inbound or outbound component.

The configuration dialog box 900 includes a configuration tree 902 including folders that contain configuration and connection properties for the selected eWay or message destination, and a toolbar 904 containing a series of buttons used to sort and modify the information listed in a properties folder 905. For example, the properties folder 905 illustrates properties for a file as the outgoing path of the eWay and includes the type of input as well as the location path of the source file.

The toolbar 904 can include buttons to sort information by name or type. Additionally, in one implementation, the information can be sorted to display only the properties of an eWay or message destination that can be modified. The toolbar 904 can also include a customizer button that displays a customizer dialog box, with which the user can customize a selected eWay or message destination. The configuration dialog box 900 also includes a description box 906, which can contain a brief description of the contents of the item or items currently selected in the configuration tree 902, and a comments box 908 which can include user comments about the item selected in the configuration tree 902.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in a physical information carrier, e.g., in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 12:
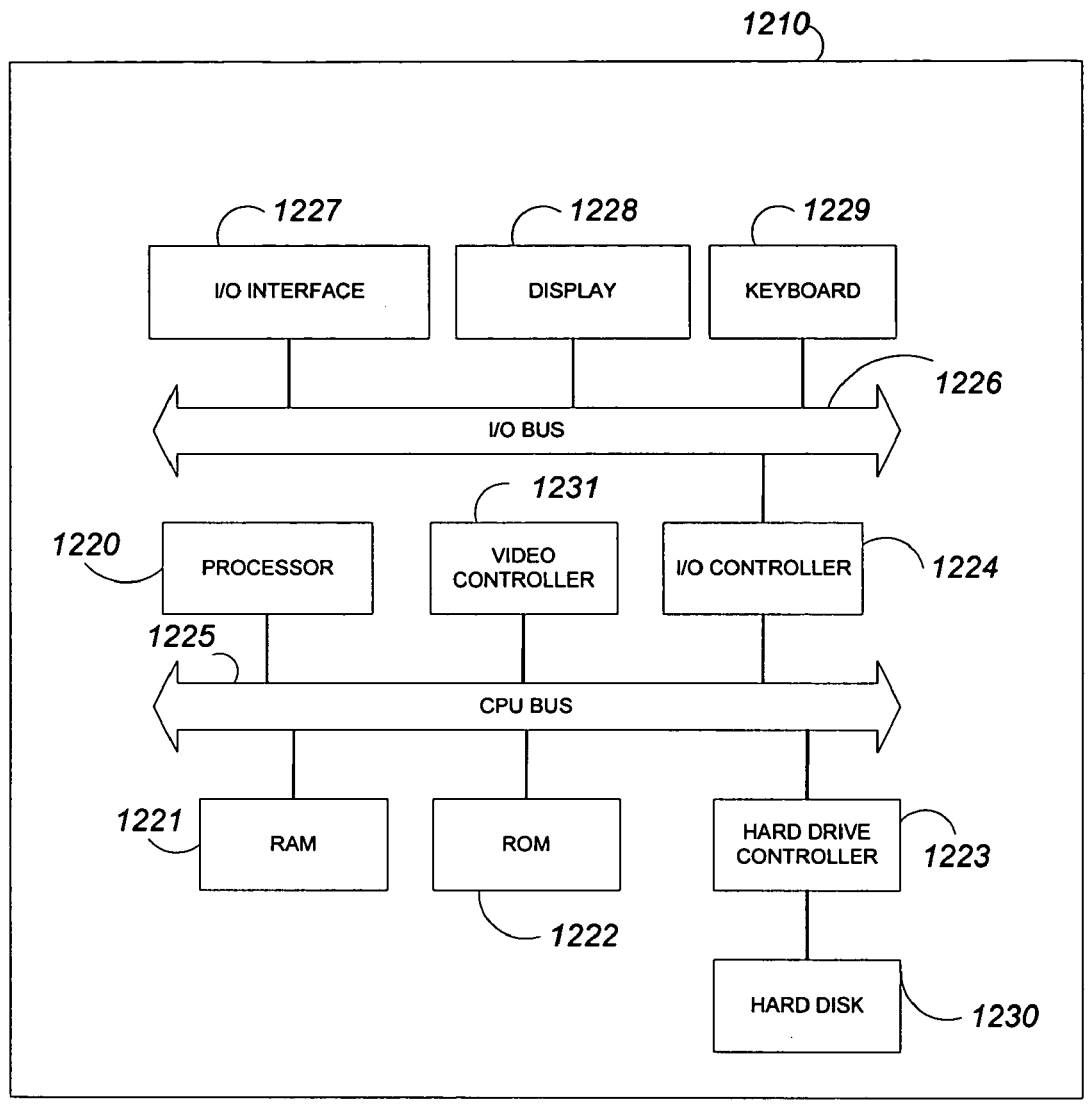
FIG. 12 shows a computer system.

An example of one such type of computer is shown in FIG. 12, which shows a block diagram of a programmable processing system (system) 1210 suitable for implementing or performing the apparatus or methods of the invention. The system 1210 includes a processor 1220, a random access memory (RAM) 1221, a program memory 1222 (for example, a writable read-only memory (ROM) such as a flash ROM), a hard drive controller 1223, a video controller 1231, and an input/output (I/O) controller 1224 coupled by a processor (CPU) bus 1225. The system 1210 can be preprogrammed, in ROM, for example, or it can be programmed (and reprogrammed) by loading a program from another source (for example, from a floppy disk, a CD-ROM, or another computer).

The hard drive controller 1223 is coupled to a hard disk 1230 suitable for storing executable computer programs, including programs embodying the present invention, and data.

The I/O controller 1224 is coupled by means of an I/O bus 1226 to an I/O interface 1227. The I/O interface 1227 receives and transmits data (e.g., stills, pictures, movies, and animations for importing into a composition) in analog or digital form over communication links such as a serial link, local area network, wireless link, and parallel link.

Also coupled to the I/O bus 1226 is a display 1228 and a keyboard 1229. Alternatively, separate connections (separate buses) can be used for the I/O interface 1227, display 1228 and keyboard 1229.

The invention has been described in terms of particular embodiments. Other embodiments are within the scope of the following claims. For example, the steps of the invention can be performed in a different order and still achieve desirable results.

What is claimed is:

1. A method for defining components and connections in an integration project, comprising:
    displaying a connectivity map editor within a graphical user interface window;
    receiving input to add a first component to said connectivity map editor, the first component representing a first networked resource located on a first computer system, wherein said first computer is configured to execute said first networked resource;
    receiving input to add a second component to said connectivity map editor, the second component representing a second networked resource located on a second computer system, wherein said second computer is configured to execute said second networked resource;
    receiving input to add a connection component to the connectivity map editor that graphically links the first component to the second component, wherein the connection component further comprises an icon that is selectable to form the graphical link, the connection component representing a networked connection resource configured to manage the flow of data between the first networked resource and the second networked resource, wherein said networked connection resource is an executable application that is one selected from a group consisting of a Java Messaging Service (JMS) and an eWay messaging service, wherein the networked connection resource is separate from said first networked resource and the second networked resource, and wherein said first networked resource and the second networked resource are configured to communicate using the networked connection resource;
receiving input to configure said networked connection resource including receiving configuration data that specifies how to connect over the data network to said first networked resource and how to obtain data from said first network resource, wherein configuring the networked connection resource comprises:
designating the networked connection resource as one selected from a group consisting of an inbound connection and an outbound connection from one of the first component and the second component to obtain a designated connection, and
configuring connection properties, displayed in a configuration tree within a dialog box, for the designated connection;
storing a definition of a project, the project definition including information for configuring an instance of said networked connection resource on said second computer system to:
connect said second network resource, over a data network operatively connecting said first computer system and said second computer system, to said first networked resource according to said configuration data,
obtain data from said first network resource according to said configuration data, and
provide data that reflects the data obtained from said first network resource to said second networked resource.

2. The method of claim 1:
wherein the first networked resource executes on a first operating system and the second networked resource executes on a second operating system, and wherein the first and second operating systems are different operating systems.

3. The method of claim 2:
wherein the first operating system is a Microsoft Windows operating system and the second operating system is UNIX operating system.

4. The method of claim 1:
wherein the second networked resource is an application configured to execute a set of business rules.

5. The method of claim 1:
wherein the second networked resource is a message destination.

6. The method of claim 5:
wherein the message destination is a topic application that conforms to a publish/subscribe messaging mechanism.

7. The method of claim 5:
wherein the message destination is a queue application that conforms to a point-to-point messaging mechanism.

8. The method of claim 1, wherein the first networked resource is an external application, the method further comprising:
in response to receiving input to add the connection component, selecting the networked connection resource for connecting the first networked resource to the second network resource based on a type of the external application.

9. The method of claim 8:
wherein the external application is a relational database management system application and wherein selecting the adapter application is based on the external application being a particular type of relational database management system application.

10. The method of claim 8:
wherein the external application is an enterprise resource planning application and wherein selecting the adapter application is based on the external application being a particular type of enterprise resource planning application.

11. The method of claim 1:
wherein the networked connection resource comprises a Java Message Service.

12. A computer-readable storage medium having stored thereon instructions executable by a processor to perform a method, the method comprising:
displaying a connectivity map editor within a graphical user interface window;
receiving input to add a first component to said connectivity map editor, the first component representing a first networked resource located on a first computer system, wherein said first computer is configured to execute said first networked resource;
receiving input to add a second component to said connectivity map editor, the second component representing a second networked resource located on a second computer system, wherein said second computer is configured to execute said second networked resource;
receiving input to add a connection component to the connectivity map editor that graphically links the first component to the second component, wherein the connection component further comprises an icon that is selectable to form the graphical link, the connection component representing a networked connection resource configured to manage the flow of data between the first networked resource and the second networked resource, wherein said networked connection resource is an executable application that is one selected from a group consisting of a Java Messaging Service (JMS) and an eWay messaging service, wherein the networked connection resource is separate from said first networked resource and the second networked resource, and wherein said first networked resource and the second networked resource are configured to communicate using the networked connection resource;
receiving input to configure said networked connection resource including configuration data that specifies how to connect over the data network to said first networked resource and how to obtain data from said first network resource, wherein configuring the networked connection resource comprises:
designating the networked connection resource as one selected from a group consisting of an inbound connection and an outbound connection from one of the first component and the second component to obtain a designated connection, and
configuring connection properties, displayed in a configuration tree within a dialog box, for the designated connection;
storing a definition of a project, the project definition including information for configuring an instance of said networked connection resource executing on said second computer system to:
connect said second network resource, over a data network operatively connecting said first computer system and said second computer system, to said first networked resource according to said configuration data,
obtain data from said first network resource according to said configuration data, and
provide data that reflects the data obtained from said first network resource to said second networked resource.

13. The computer-readable storage medium of claim 12:
wherein the first networked resource executes on a first operating system and the second networked resource executes on a second operating system, and where the first and second operating systems are different operating systems.

14. The computer-readable storage medium of claim 12, wherein the first operating system is a Microsoft Windows operating system and the second operating system is a UNIX operating system.

15. The computer-readable storage medium of claim 12:
wherein the first networked resource is an external application, and
wherein the computer-readable medium further comprises instructions stored thereon and executable by the processor to:
in response to receiving input to add the connection component, selecting the networked connection resource for connecting the first networked resource to the second network resource based on a type of the external application.

16. The computer-readable storage medium of claim 15:
wherein the external application is a relational database management system application and wherein selecting the networked connection resource is based on the external application being a particular type of relational database management system application.

17. The computer-readable storage medium of claim 15:
wherein the external application is an enterprise resource planning application and wherein selecting the networked connection resource is based on the external application being a particular type of enterprise resource planning application.

18. The computer-readable storage medium of claim 15:
wherein the networked connection resource comprises a Java Message Service.

* * * * *